US 6,642,061 B2

(12) United States Patent
Ellson et al.

(10) Patent No.: US 6,642,061 B2
(45) Date of Patent: Nov. 4, 2003

(54) USE OF IMMISCIBLE FLUIDS IN DROPLET EJECTION THROUGH APPLICATION OF FOCUSED ACOUSTIC ENERGY

(75) Inventors: Richard N. Ellson, Palo Alto, CA (US); Mitchell W. Mutz, Palo Alto, CA (US); James K. Foote, Cupertino, CA (US)

(73) Assignee: Picoliter Inc., Sunnyvale, CA (US)

( * ) Notice: Subject to any disclaimer, the term of this patent is extended or adjusted under 35 U.S.C. 154(b) by 41 days.

(21) Appl. No.: 10/112,693

(22) Filed: Mar. 28, 2002

(65) Prior Publication Data

US 2002/0155231 A1 Oct. 24, 2002

Related U.S. Application Data

(63) Continuation-in-part of application No. 09/962,730, filed on Sep. 24, 2001, now Pat. No. 6,548,308, which is a continuation-in-part of application No. 09/669,194, filed on Sep. 25, 2000, now abandoned.

(51) Int. Cl.[7] .............................. B01L 3/02; B41J 2/04
(52) U.S. Cl. .................. 436/180; 347/46; 422/100; 436/86; 436/94
(58) Field of Search .......................... 436/180, 57, 71, 436/73, 86, 94; 422/100; 347/46

(56) References Cited

U.S. PATENT DOCUMENTS

| 3,986,669 A | 10/1976 | Martner |
| 4,089,801 A | 5/1978 | Schneider |
| 4,308,547 A | 12/1981 | Lovelady et al. |
| 4,697,195 A | 9/1987 | Quate et al. |
| 4,719,476 A | 1/1988 | Elrod et al. |
| 4,734,706 A * | 3/1988 | Le et al. .................. 347/71 |
| 4,751,529 A | 6/1988 | Elrod et al. |
| 4,751,530 A | 6/1988 | Elrod et al. |
| 4,751,534 A | 6/1988 | Elrod et al. |
| 4,797,693 A | 1/1989 | Quate |
| 4,801,411 A | 1/1989 | Wellinghoff et al. |
| 4,801,953 A | 1/1989 | Quate |
| 4,812,856 A | 3/1989 | Wallace |
| 4,959,674 A | 9/1990 | Khri-Yakub et al. |
| 5,041,849 A | 8/1991 | Quate et al. |
| 5,087,931 A | 2/1992 | Rawson |
| 5,122,818 A | 6/1992 | Elrod et al. |
| 5,216,451 A | 6/1993 | Rawson et al. |
| 5,229,016 A | 7/1993 | Hayes et al. |
| 5,229,793 A | 7/1993 | Hadimioglu et al. |

(List continued on next page.)

FOREIGN PATENT DOCUMENTS

| DE | 19752585 A1 | 6/1999 |
| EP | 0434931 A2 | 7/1991 |
| WO | WO 00/12278 | 3/2000 |
| WO | WO 00/17413 | 3/2000 |

OTHER PUBLICATIONS

Elrod et al. (1989), "Nozzleless Droplet Formation with Focused Acoustic Beams," *J. Appl. Phys.* 65(9):3441–3447.
Hadimioglu et al. (1992), "Acoustic Ink Printing," *Ultrasonics Symposium*, pp. 929–935.

(List continued on next page.)

Primary Examiner—Jan Ludlow
(74) Attorney, Agent, or Firm—Reed & Eberle LLP; Louis L. Wu

(57) ABSTRACT

The invention provides a method for generating droplets. Extremely fine droplets may be generated (on the order of 1 picoliter or less) using focused acoustic energy to eject the droplets from a reservoir containing two or more immiscible fluids. The droplets may include immiscible fluids or a single fluid. Typically, the droplets are ejected onto discrete sites on a substrate surface so as to form an array thereon. In some instances, the reservoirs contain layers of immiscible fluids, wherein an upper layer exhibits a nonuniform thickness. In such a case, fluid from a lower fluid layer may be propelled through an aperture region of the upper layer.

25 Claims, 3 Drawing Sheets

U.S. PATENT DOCUMENTS

| | | |
|---|---|---|
| 5,231,426 A | 7/1993 | Sweet |
| 5,339,101 A | 8/1994 | Rawson et al. |
| 5,377,902 A | 1/1995 | Hayes |
| 5,392,064 A | 2/1995 | Hadimioglu et al. |
| 5,415,679 A | 5/1995 | Wallace |
| 5,436,327 A | 7/1995 | Southern et al. |
| 5,498,444 A | 3/1996 | Hayes |
| 5,520,715 A | 5/1996 | Oeftering |
| 5,556,752 A | 9/1996 | Lockhart et al. |
| 5,591,490 A | 1/1997 | Quate |
| 5,608,433 A | 3/1997 | Quate |
| 5,629,724 A | 5/1997 | Elrod et al. |
| 5,631,678 A | 5/1997 | Hadimioglu et al. |
| 5,643,353 A | 7/1997 | Wallace et al. |
| 5,658,802 A | 8/1997 | Hayes et al. |
| 5,669,971 A | 9/1997 | Bok et al. |
| 5,722,479 A | 3/1998 | Oeftering |
| 5,744,305 A | 4/1998 | Fodor et al. |
| 5,798,779 A | 8/1998 | Nakayasu et al. |
| 5,808,636 A | 9/1998 | Stearns |
| 6,010,316 A | 1/2000 | Haller et al. |
| 6,015,880 A | 1/2000 | Baldeschwieler et al. |
| 6,028,189 A | 2/2000 | Blanchard |
| 6,029,896 A | 2/2000 | Self et al. |
| 6,110,426 A | 8/2000 | Shalon et al. |
| 6,444,019 B1 * | 9/2002 | Zou et al. .................. 106/31.4 |
| 2002/0037359 A1 | 3/2002 | Mutz et al. |
| 2002/0037579 A1 | 3/2002 | Ellson et al. |
| 2002/0140118 A1 * | 10/2002 | Lee ............................... 264/9 |
| 2002/0142049 A1 * | 10/2002 | Lee ........................... 424/499 |

OTHER PUBLICATIONS

MacBeath et al. (2000), "Printing Proteins as Microarrays for High–Throughput Function Determination," *Science* 289:1760–1763.

Amemiya et al. (1997), *Proceedings of the 1997 IS& T's NIP 13: 1997 International Conference on Digital Printing Technologies*, pp. 698–702.

Steel et al. (2000), "The Flow–Thru Chip™: A Three–Dimensional Biochip Platform," *Microarray Biochip Technology*, Chapter 5, pp. 87–117, BioTechniques Books, Natick, MA.

\* cited by examiner

USE OF IMMISCIBLE FLUIDS IN DROPLET EJECTION THROUGH APPLICATION OF FOCUSED ACOUSTIC ENERGY

CROSS-REFERENCE TO RELATED APPLICATIONS

This is a continuation-in-part of U.S. patent application Ser. No. 09/962,730, filed Sep. 24, 2001, now U.S. Pat. No. 6,548,308 which is a continuation-in-part of U.S. patent application Ser. No. 09/669,194, filed Sep. 25, 2000, now abandoned the disclosures of which are incorporated by reference herein.

TECHNICAL FIELD

This invention relates generally to methods for generating fluid droplets from a reservoir of immiscible fluids using focused acoustic energy. More particularly, the invention relates to methods for forming one or more features on a substrate surface from one or more reservoirs of immiscible fluid.

BACKGROUND

It is often desirable to generate droplets of a fluid mixture composed of substances that are normally immiscible with one another, wherein one or more of the components may be viscous. Using prior methods for generating droplets of viscous fluids, however, it has been difficult to achieve control over droplet size. For example, conventional inkjet technologies, such as piezoelectric and thermal inkjet printing, have been limited by the need to force a viscous material through a small nozzle. In order to dispense quantities of fluid on the order of 1 picoliter in volume, nozzle openings with dimensions of under 30 micrometers would be required. The energy required to move a viscous fluid out of such a small nozzle opening would be great and would likely result in substantial shearing of the fluidic material. Nozzle clogging also poses a problem with these types of printing technologies.

For a thermal inkjet printer, the ejection energy comes from the vaporization of the fluid to be printed. Most viscous fluids have an extremely high boiling point and would require significant thermal energy input. Piezoelectric printing might be a more efficient way of ejecting droplets of viscous material, but the thermal energy required would still be substantial. For example, U.S. Pat. No. 5,229,016 describes a method for dispensing solder with a piezoelectric ejection device. The system requires elevated temperature and a backpressure system of 30 psi in order to eject solder through a 25 micrometer orifice. Even with pressure assist, the maximum ejection rate for solder is on the order of 10 kHz. In U.S. Pat. No. 5,498,444, a method is described for ejecting polymers using a piezoelectric ejection device that operates at up to 40 cps, along with elevated temperatures. The need for elevated temperatures, of course, reduces the number of materials with which one can work, as heating many materials in order to reduce viscosity can result in degradation. Other devices for producing droplets of fluids, such as described, for example, in U.S. Pat. No. 4,812,856 to Wallace et al., are disadvantageous in various respects as well, including slow repetition rate due to refill time.

Use of focused acoustic energy in printing technology is known in the art. For example, U.S. Pat. No. 4,308,547 to Lovelady et al. describes a liquid drop emitter that utilizes acoustic principles in the ejection of liquid from a body of liquid onto a moving document to form characters or bar codes thereon. Specifically, Lovelady et al. is directed to a nozzleless inkjet printing apparatus, wherein controlled drops of ink are propelled by an acoustical force that is produced by a curved transducer at or below the surface of the ink. In contrast to inkjet printing devices, nozzleless fluid ejection devices (as described in the aforementioned patent) are not prone to clogging and the associated disadvantages, e.g., misdirected fluid or improperly sized droplets.

The development of nozzleless fluid ejection, however, has generally been limited to ink printing applications. Since the development of ink printing technology is strongly influenced by economic concerns, the bulk of development efforts have been concentrated on reducing printing costs and improving printing speed, rather than on enhancing print quality. For example, U.S. Pat. No. 5,087,931 to Rawson is directed to a system for transporting ink under constant flow to an acoustic ink printer having a plurality of ejectors aligned in an axis, each ejector associated with a free surface of liquid ink. Having a plurality of ejectors generally increases printing speed. However, it is more difficult to control fluid ejection, specifically droplet placement, when a plurality of ejectors is used in place of a single ejector.

As another example, U.S. Pat. No. 4,797,693 to Quate describes an acoustic ink printer for printing polychromatic images on a recording medium. The printer is described as comprising a combination of a carrier that contains a plurality of differently colored liquid inks, a single acoustic printhead acoustically coupled to the carrier for launching converging acoustic waves into the carrier, an ink transport means to position the carrier to sequentially bring the differently colored inks into alignment with the printhead, and a controller to modulate the radiation pressure exerted against the inks. It has been disclosed that this type of printer is designed with cost effectiveness in mind. However, this device can eject only a limited quantity of ink from the carrier before the liquid surface moves out of acoustic focus and drop ejection ceases.

The technique of using unfocused acoustic energy to generate droplets of immiscible fluids is also known in the art. For example, U.S. Pat. No. 4,801,411 to Wellinghoff et al. is generally directed to the production of ceramic particles. In particular, the patent describes that ultrasonic energy may be employed to produce an aerosol spray of two-layer droplets. The technique involves using unfocused ultrasonic energy to effect cavitation in a reservoir containing a stable bilayer of two immiscible liquids in order to form the two-layer droplets. As a result, the technique produces a spray of particles of random size, thus failing to provide the level of control over droplet size and direction that characterizes technologies using focused acoustic energy to produce uniform droplets.

Thus, there is a need in the art for improved systems that make use of focused acoustic ejection technology in combination with reservoirs of immiscible fluids to generate fluid droplets, but without the disadvantages associated with inkjet printing devices relying on a nozzle for droplet ejection, and other prior acoustic ejection systems. In addition, it has recently been discovered that use of immiscible fluids provides additional benefits previously unknown in the art of acoustic ejection, particularly in the field of array preparation.

SUMMARY OF THE INVENTION

In one aspect, then, the invention relates to a method for forming a feature on a substrate surface. The method involves providing a fluid-containing reservoir containing at least two immiscible fluids and a substrate surface, porous or nonporous, in droplet-receiving relationship to the fluid-containing reservoir. Focused acoustic energy is applied in a manner effective to eject a droplet of fluid from the reservoir such that the droplet is deposited on the substrate surface, thereby forming a feature thereon. The ejected droplet is comprised of at the least two immiscible fluids. As a result, the feature formed on the substrate surface may comprise one fluid circumscribed by another. While features of any size may be formed, the circumscribed fluid typically has a diameter of about 2 to about 200 micrometers. Preferably, the circumscribed fluid has a diameter of about 5 to about 50 micrometers.

Any of a number of types of fluids may be used. Typically, one of the fluids is aqueous and another of the fluids is nonaqueous. When the invention is used in biomolecular applications, either the aqueous or nonaqueous fluids may contain a biomolecule. In some embodiments, the biomolecule may be selected from the group consisting of DNA, RNA, antisense oligonucleotides, peptides, proteins, ribosomes, and enzyme cofactors. In addition or in the alternative, the biomolecule may be a pharmaceutical agent. In either case, one or more dyes may be used. For example, each of the aqueous and nonaqueous fluids may contain a different fluorescent and/or chemiluminescent dye. Furthermore, either the aqueous or the nonaqueous fluid may contain a surface-modifying material capable of altering the wetting properties of the substrate surface. In such a case, fluid may be evaporated from a deposited feature to allow the surface-modifying material to alter the wetting properties of the substrate surface at the location of the feature.

The nonaqueous fluid may contain a number of organic materials. In some instances, the organic material is selected from the group consisting of hydrocarbons, halocarbons, hydrohalocarbons, haloethers, hydrohaloethers, silicones, halosilicones, and hydrohalosilicones. In addition or in the alternative, the organic material may be lipidic and optionally selected from the group consisting of fatty acids, fatty acid esters, fatty alcohols, glycolipids, oils, and waxes. In some instances, at least two fluids may be organic.

Typically, the reservoirs contain a lower layer comprised of a first fluid, and an upper layer comprised of a second fluid, wherein the first and second fluids are immiscible. As a whole, the lower layer may exhibit a greater thickness than the upper layer. In addition or in the alterative, the second fluid may have a higher vaporization temperature than the first fluid. When the upper layer has a nonuniform thickness, focused acoustic energy may be applied to the reservoir to eject a droplet comprised of a predetermined volume of the first fluid through the upper layer at an aperture region that exhibits a local thickness minimum.

In such a case, the lower layer under the aperture region of the upper layer typically exhibits a greater thickness than the local thickness minimum of the upper layer. The local thickness minimum may be no more than about 10% of the thickness of the lower layer under the aperture region. In some instances, the aperture region of the upper layer may be a molecular bilayer or molecular monolayer. In the most extreme case, the aperture region is a hole that extends through the upper layer. In order to ensure that the aperture region has a sufficiently large cross-sectional area for droplets to be ejected therethrough, the aperture region typically has a diameter of at least about twice, but not more than 10 times, that of the ejected droplet.

In some instances, the spatial relationship between the substrate surface and the reservoir is altered. By applying focused acoustic energy in a manner effective to eject another droplet of fluid from the reservoir such that the droplet is deposited on the substrate surface at another site, a plurality of features may be formed on the substrate surface. When the application of focused acoustic energy is coordinated with the movement of the substrate surface with respect to the reservoir, an array of substantially identical features may be formed on the substrate surface.

The invention also relates to a method for forming an array of features on a substrate surface. When different feature types are desired in the array, a plurality of fluid-containing reservoirs may be provided, each containing at least two immiscible fluids. Although the fluid content of each reservoir is typically different from the other(s), each reservoir may contain at least one fluid in common. By placing the substrate surface in droplet-receiving relationship to the fluid-containing reservoirs and applying focused acoustic energy in a manner effective to eject a droplet of fluid from each of the reservoirs, the droplets are deposited at different sites on the substrate surface. As a result, an array of different features may be formed on the substrate surface. In such a case, each ejected droplet is comprised of at the least two immiscible fluids contained in the fluid-containing reservoir from which the droplet is ejected.

In some instances, the droplets are deposited successively. This is typically the case when a single ejector is used. In other instances, the droplets are deposited simultaneously.

The invention further relates to a method for reducing the size of a feature formed by a device that creates a feature of a specific nominal size on a substrate. The method involves the use of a device that includes a reservoir adapted to contain a feature-forming fluid and an ejector for ejecting a fluid droplet of a predetermined volume from the reservoir. The ejector includes an acoustic radiation generator for generating acoustic radiation, and a focusing means for focusing the generated acoustic radiation. When the ejector is positioned in acoustic coupled relationship to the reservoir, the focusing means directs the acoustic radiation at a focal point sufficiently near the fluid surface in the reservoir so as to eject and deposit the droplet on a substrate. As a result, the device is capable of forming a feature of the desired nominal size on the substrate surface, wherein the nominal size corresponds to the predetermined volume.

Instead of filling the reservoir with a single fluid, the reservoir is filled with a feature-forming fluid and an additional fluid that is immiscible with the feature-forming fluid. Once substrate is provided in droplet-receiving relationship to the reservoir, the device is activated to generate focused acoustic energy in a manner effective to eject a droplet of the predetermined volume and comprised of the immiscible fluids from the reservoir. As a result, the ejected droplet is deposited on the substrate surface, thereby forming a feature of the feature-forming fluid on the substrate. Because the feature-forming fluid occupies only a portion of the predetermined droplet volume, the formed feature is smaller than the nominal feature size.

BRIEF DESCRIPTION OF THE DRAWINGS

FIG. 1A shows the acoustic ejector acoustically coupled to a first reservoir and having been activated in order to eject a first droplet of fluid from within the reservoir toward a particular site on a substrate surface. FIG. 1B shows the acoustic ejector acoustically coupled to a second reservoir and having been activated to eject a second droplet of fluid from within the second reservoir.

FIG. 2A illustrates the substrate surface after the deposition of the first droplet of fluid thereon. FIG. 2B illustrates the substrate after the deposition of the second droplet of fluid thereon. FIG. 2C illustrates the removal of one component of the droplets to result in reduced feature sizes.

DETAILED DESCRIPTION OF THE INVENTION

Figure 1A:
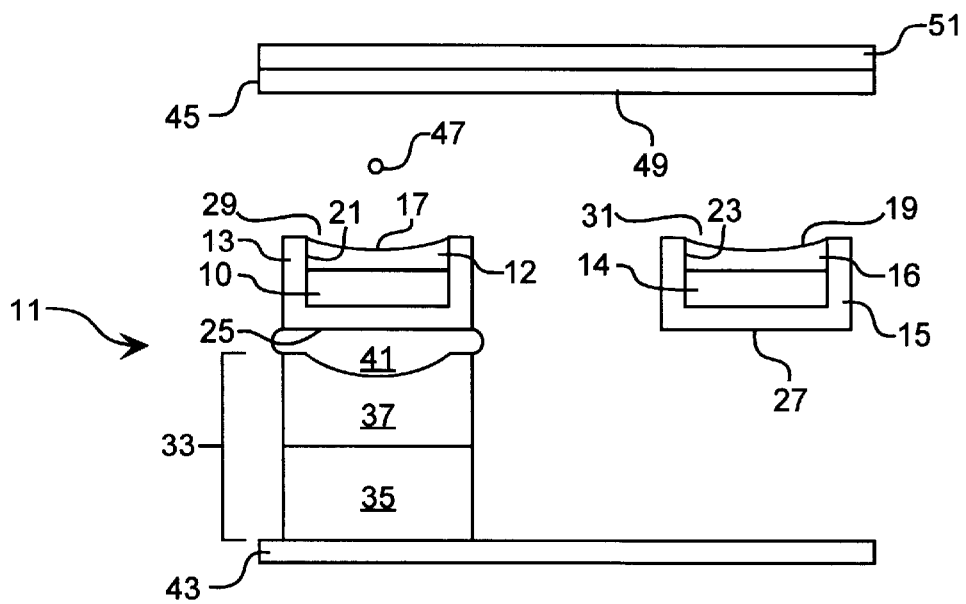
FIGS. 1A and 1B, collectively referred to as FIG. 1, schematically illustrate in simplified cross-sectional view the operation of a focused acoustic ejection device in the preparation of a plurality of features on a substrate surface.

Before describing the present invention in detail, it is to be understood that, unless otherwise indicated, this invention is not limited to specific fluids, acoustic ejection devices, substrates, or the like, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly dictates otherwise. Thus, for example, the term "a fluid" is intended to mean a single fluid or a mixture of fluids, "a reservoir" is intended to mean one or more reservoirs, and the like.

In describing and claiming the present invention, the following terminology will be used in accordance with the definitions established below.

The term "adsorb" as used herein refers to the noncovalent retention of a molecule by a substrate surface. That is, adsorption occurs as a result of noncovalent interaction between a substrate surface and adsorbing moieties present on the molecule that is adsorbed. Adsorption may occur through hydrogen bonding, van der Waal's forces, polar attraction, or electrostatic forces (i.e., through ionic bonding). Examples of adsorbing moieties include, but are not limited to, amine groups, carboxylic acid moieties, hydroxyl groups, nitroso groups, sulfones, and the like.

The terms "acoustic coupling" and "acoustically coupled" as used herein refer to a state wherein an object is placed in direct or indirect contact with another object so as to allow acoustic radiation to be transferred between the objects without substantial loss of acoustic energy. When two items are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid, to transfer acoustic radiation generated by the ejector through the acoustic coupling medium and into the fluid.

The term "aperture region" as used herein applies to a layer of fluid having nonuniform thickness within a reservoir, and refers to an area of the layer that exhibits a local thickness minimum. Typically, but not necessarily, the aperture region exhibits a substantially uniform thickness. Although the shape of aperture region is influenced by many factors, such as the fluids contained in the reservoir and the shape of the reservoir, the aperture region is typically circular in form. Notably, the aperture region may have no thickness, i.e., a zero thickness, and may thus comprise an opening extending through the fluid layer.

The term "attached," as in, for example, a substrate surface having an oligonucleotide "attached" thereto, refers to covalent binding, adsorption, and physical immobilization. The terms "binding" and "bound" are identical in meaning to the term "attached."

The term "array" as used herein refers to a two-dimensional arrangement of features on a substrate surface. In the present arrays, the "features" are peptidic molecules. Arrays are generally comprised of regular, ordered features, as in, for example, a rectilinear grid, parallel stripes, spirals, and the like; but non-ordered arrays may be advantageously used as well. The arrays prepared using the method of the invention generally comprise in the range of about 4 to about 10,000,000 features, more typically about 4 to about 1,000,000 features.

The terms "biomolecule" and "biological molecule" are used interchangeably herein to refer to any organic molecule—whether naturally occurring, recombinantly produced, or chemically synthesized in whole or in part—that is, was, or can be a part of a living organism. The terms encompass, for example, nucleotides, amino acids, and monosaccharides, as well as oligomeric and polymeric species such as oligonucleotides and polynucleotides, peptidic molecules such as oligopeptides, polypeptides and proteins, saccharides such as disaccharides, oligosaccharides, polysaccharides, mucopolysaccharides or peptidoglycans (peptido-polysaccharides) and the like. The term also encompasses ribosomes, enzyme cofactors, pharmacologically active agents, and the like.

The term "encapsulate" as in "a first fluid encapsulating a second another" refers to a situation wherein the second fluid is enclosed within the first fluid. The terms "encapsulate" and "circumscribe" are used somewhat interchangeably except that the term "encapsulate" is typically used in a three-dimensional context whereas the term "circumscribe" is typically used in a two-dimensional sense. Thus, a droplet floating freely in space, i.e., not in contact with a solid surface, may be formed from one fluid "encapsulating" another, whereas a droplet on a planar substrate surface may be formed from one fluid "circumscribing" another.

The term "fluid" as used herein refers to matter that is nonsolid, or at least partially gaseous and/or liquid. A fluid may contain a solid that is minimally, partially, or fully solvated, dispersed, or suspended. Examples of fluids include, without limitation, aqueous liquids (including water per se and salt water) and nonaqueous liquids such as organic solvents, lipidic liquids, and the like. As used herein, the term "fluid" is not synonymous with the term "ink" in that an ink must contain a colorant and may not be gaseous.

The terms "focusing means" and "acoustic focusing means" as used herein refer to a means for causing acoustic waves to converge at a focal point by either a device separate from the acoustic energy source that acts like an optical lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as known in the art and described, for example, in U.S. Pat. No. 5,798,779 to Nakayasu et al. and Amemiya et al. (1997) *Proceedings of the 1997 IS&T NIP13 International Conference on Digital Printing Technologies,* pp. 698–702.

The term "immiscible" is used in its conventional sense to refer to two fluids that are less than completely miscible, in that mixing two such fluids results in a mixture containing more than one fluid phase. It is preferred that two "immiscible" fluids as provided herein be completely or almost completely immiscible, i.e., give rise to a mixture containing two phases, wherein each phase contains at least about 95%, preferably at least about 99%, of a single fluid. In addition, the term is intended to encompass situations wherein two fluids in contact remain separate phases over an extended period of time but eventually mixes. That is, such fluids are "kinetically immiscible." In such a case, it is preferred that such fluids remain as separate phases for at least 10 minutes, more preferably for at least an hour, and optimally for over 24 hours.

The term "reservoir" as used herein refers a receptacle or chamber for holding or containing a fluid. Thus, a fluid in a reservoir necessarily has a free surface, i.e., a surface that allows a droplet to be ejected therefrom.

The term "substrate" as used herein refers to any material having a surface onto which one or more fluids may be deposited. The substrate may be constructed in any of a number of forms, such as wafers, slides, well plates, and membranes, for example. In addition, the substrate may be porous or nonporous as may be required for deposition of a particular fluid. Suitable substrate materials include, but are not limited to, supports that are typically used for solid phase chemical synthesis, for example, polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, and divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, and such substrates treated with surface coatings, e.g., with microporous polymers (particularly cellulosic polymers such as nitrocellulose), microporous metallic compounds (particularly microporous aluminum), antibody-binding proteins (available from Pierce Chemical Co., Rockford, Ill.), bisphenol A polycarbonate, or the like.

Substrates of particular interest are porous, and include, as alluded to above: uncoated porous glass slides, including CPG slides; porous glass slides coated with a polymeric coating, e.g., an aminosilane or poly-L-lysine coating, thus having a porous polymeric surface; and nonporous glass slides coated with a porous coating. The porous coating may be a porous polymer coating comprised of a cellulosic polymer (e.g., nitrocellulose) or polyacrylamide, or a porous metallic coating (for example, comprised of microporous aluminum). Examples of commercially available substrates having porous surfaces include the Fluorescent Array Surface Technology (FAST™) slides available from Schleicher & Schuell, Inc. (Keene, N.H.), which are coated with a 10–30 micrometer-thick porous, fluid-permeable nitrocellulose layer that substantially increases the available binding area per unit area of surface. Other commercially available porous substrates include the CREATIVECHIP® permeable slides currently available from Eppendorf A G (Hamburg, Germany), and substrates having "three-dimensional" geometry, by virtue of an ordered, highly porous structure that enables reagents to flow into and penetrate through the pores and channels of the entire structure. Such substrates are available from Gene Logic, Inc. under the tradename "Flow-Thru Chip," and are described by Steel et al. in Chapter 5 of *Microarray Biochip Technology* (BioTechniques Books, Natick, Mass., 2000).

The term "porous," as in a "porous substrate" or a "substrate having a porous surface," refers to a substrate or surface, respectively, having a porosity (void percentage) in the range of about 1% to about 99%, preferably about 5% to about 99%, more preferably in the range of about 15% to about 95%, and an average pore size of about 100 Å to about 1 mm, typically about 500 Å to about 0.5 mm.

The term "impermeable" is used in the conventional sense to mean not permitting water or other fluid to pass through. The term "permeable" as used herein means not "impermeable." Thus, a "permeable substrate" and a "substrate having a permeable surface" refer to a substrate or surface, respectively, which can be permeated with water or other fluid.

While the foregoing support materials are representative of conventionally used substrates, it is to be understood that a substrate may in fact comprise any biological, nonbiological, organic, and/or inorganic material, and may be in any of a variety of physical forms, e.g., particles, strands, precipitates, gels, sheets, tubing, spheres, containers, capillaries, pads, slices, films, plates, and the like, and may further have any desired shape, such as a disc, square, sphere, circle, etc. The substrate surface may or may not be flat, e.g., the surface may contain raised or depressed regions. A substrate may additionally contain, or be derivatized to contain, reactive functionalities that covalently link a compound to the substrate surface. These are widely known and include, for example, silicon dioxide supports containing reactive Si—OH groups, polyacrylamide supports, polystyrene supports, polyethylene glycol supports, and the like.

The term "surface modification" as used herein refers to the chemical and/or physical alteration of a surface by an additive or subtractive process to change one or more chemical and/or physical properties of a substrate surface or a selected site or region of a substrate surface. For example, surface modification may involve (1) changing the wetting properties of a surface, (2) functionalizing a surface, i.e., providing, modifying or substituting surface functional groups, (3) defunctionalizing a surface, i.e., removing surface functional groups, (4) otherwise altering the chemical composition of a surface, e.g., through etching, (5) increasing or decreasing surface roughness, (6) providing a coating on a surface, e.g., a coating that exhibits wetting properties that are different from the wetting properties of the surface, and/or (7) depositing particulates on a surface.

"Optional" or "optionally" means that the subsequently described circumstance may or may not occur, so that the description includes instances where the circumstance occurs and instances where it does not.

The term "substantially" as in, for example, the phrase "substantially all molecules of an array," refers to at least 90%, preferably at least 95%, more preferably at least 99%, and most preferably at least 99.9% of the molecules of an array. Other uses of the term "substantially" involve an analogous definition.

The invention accordingly provides a method for forming one or more features on a substrate surface by using focused acoustic energy to generate droplets of fluid from a reservoir containing immiscible fluids. Typically, a fluid-containing reservoir is provided containing at least two immiscible fluids. A substrate surface is provided in droplet-receiving relationship to the fluid-containing reservoir. Focused acoustic energy is applied in a manner described in detail in co-pending patent application U.S. Ser. No. 09/669,996 ("Acoustic Ejection of Fluids From a Plurality of Reservoirs"), inventors Ellson, Foote, and Mutz, filed Sep. 25, 2000 (now abandoned) and assigned to Picoliter, Inc. (Mountain View, Calif.). As explained in the aforementioned patent application, focused acoustic energy may be used to eject a fluid droplet from the free surface of a fluid (e.g., in a reservoir or well plate). The ejected droplet is comprised of the immiscible fluids and is deposited on the substrate surface. As a result, a feature comprising the droplet of immiscible fluids is formed on the substrate surface.

Also as described in U.S. patent application Ser. No. 09/669,996, a device for carrying out focused acoustic dejection may include one or more reservoirs, an ejector, and a means for positioning the ejector in acoustic coupling relationship to each of the reservoirs. Each of the reservoirs typically contains or more immiscible fluids. The ejector may comprise an acoustic radiation generator for generating acoustic radiation and a focusing means for focusing acoustic radiation. When the generated acoustic radiation is focused toward a focal point sufficiently near a fluid surface in a reservoir, droplet ejection from the surface occurs as a result.

FIG. 1 illustrates a suitable focused acoustic ejection device in simplified cross-sectional view. As with all figures referenced herein, in which like parts are referenced by like numerals, FIG. 1 is not to scale, and certain dimensions may be exaggerated for clarity of presentation. The device 11 generally (although not necessarily) includes a plurality of reservoirs, i.e., at least two reservoirs. For simplicity, the device is illustrated as containing two reservoirs, with a first reservoir indicated at 13 and a second reservoir indicated at 15; however, it is to be understood that a device containing a single reservoir or three or more reservoirs may be employed. Each reservoir contains a combination of two or more immiscible fluids, and the individual fluids as well as the fluid combinations in the different reservoirs may be the same or different. Reservoirs containing a two-fluid phase/component system are illustrated in the figure, with reservoir 13 containing a lower fluid layer 10 and an upper fluid layer 12, and reservoir 15 containing a lower fluid layer 14 and an upper fluid layer 16. It must be emphasized, however, that the two-phase system is illustrated and described merely for simplicity, and as each reservoir may contain three or more immiscible fluids, the invention is not limited in this regard. Upper fluid layers 12 and 16 have fluid surfaces respectively indicated at 17 and 19. As shown, the reservoirs are of substantially identical construction so as to be substantially acoustically indistinguishable, but identical construction is not a requirement. The reservoirs are shown as separate removable components but may, if desired, be fixed within a plate or other substrate. For example, the plurality of reservoirs may comprise individual wells in a well plate, optimally although not necessarily arranged in an array. Each of the reservoirs 13 and 15 is preferably axially symmetric as shown, having vertical walls 21 and 23 extending upward from circular reservoir bases 25 and 27 and terminating at openings 29 and 31, respectively, although other reservoir shapes may be used. The material and thickness of each reservoir base should be such that acoustic radiation may be transmitted therethrough and into the fluid contained within the reservoirs.

The device also includes an acoustic ejector 33 comprised of an acoustic radiation generator 35 for generating acoustic radiation, and a focusing means 37 for focusing the acoustic radiation at a focal point near the fluid surface from which a droplet is to be ejected, wherein the focal point is selected so as to result in droplet ejection. The focal point may be in the upper fluid layer or the lower fluid layer, but is preferably just below the interface therebetween. As shown in FIG. 1, the focusing means 37 may comprise a single solid piece having a concave surface 39 for focusing acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, respectively. The acoustic radiation generator 35 and the focusing means 37 may function as a single unit controlled by a single controller, or they may be independently controlled, depending on the desired performance of the device. Typically, single ejector designs are preferred over multiple ejector designs, because accuracy of droplet placement, as well as consistency in droplet size and velocity, are more easily achieved with a single ejector.

As will be appreciated by those skilled in the art, any of a variety of focusing means may be employed in conjunction with the present invention. For example, one or more curved surfaces may be used to direct acoustic radiation to a focal point near a fluid surface. One such technique is described in U.S. Pat. No. 4,308,547 to Lovelady et al. Focusing means with a curved surface have been incorporated into the construction of commercially available acoustic transducers such as those manufactured by Panametrics, Inc. (Waltham, Mass.). In addition, Fresnel lenses are known in the art for directing acoustic energy at a predetermined focal distance from an object plane. See, e.g., U.S. Pat. No. 5,041,849 to Quate et al. Fresnel lenses may have a radial phase profile that diffracts a substantial portion of acoustic energy into a predetermined diffraction order at diffraction angles that vary radially with respect to the lens. The diffraction angles should be selected to focus the acoustic energy within the diffraction order on a desired object plane.

There are also a number of ways to acoustically couple the ejector 33 to each individual reservoir and thus to the fluid therein. One such approach is through direct contact as is described, for example, in U.S. Pat. No. 4,308,547 to Lovelady et al., wherein a focusing means constructed from a hemispherical crystal having segmented electrodes is submerged in a liquid to be ejected. The aforementioned patent further discloses that the focusing means may be positioned at or below the surface of the liquid. However, this approach for acoustically coupling the focusing means to a fluid is undesirable when the ejector is used to eject different fluids in a plurality of containers or reservoirs, as repeated cleaning of the focusing means would be required in order to avoid cross-contamination. The cleaning process would necessarily lengthen the transition time between each droplet ejection event. In addition, with such a method, fluid would adhere to the ejector as it was removed from each container, wasting material that may be costly or rare.

Thus, a preferred approach is to acoustically couple the ejector to the reservoirs and reservoir fluids without allowing contact to occur between any portion of the ejector (e.g., the focusing means) and the fluids to be ejected. To this end, the present invention provides an ejector positioning means for positioning the ejector in controlled and repeatable acoustic coupling with each of the fluids in the reservoirs to eject droplets therefrom without submerging the ejector therein. This typically involves direct or indirect contact between the ejector and the external surface of each reservoir. When direct contact is used in order to acoustically couple the ejector to each reservoir, it is preferred that the direct contact be wholly conformal to ensure efficient acoustic energy transfer. That is, the ejector and the reservoir should have corresponding surfaces adapted for mating contact. Thus, if acoustic coupling is achieved between the ejector and reservoir through the focusing means, it is desirable for the reservoir to have an outside surface that corresponds to the surface profile of the focusing means. Without conformal contact, efficiency and accuracy of acoustic energy transfer may be compromised. In addition, since many focusing means have a curved surface, the direct contact approach may necessitate the use of reservoirs having a specially formed inverse surface.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and each reservoir. In addition, it is important to ensure that the fluid medium is substantially free of material having different acoustic properties than the fluid medium itself. As shown, the first reservoir 13 is acoustically coupled to the acoustic focusing means 37, such that an acoustic wave is generated by the acoustic radiation generator and directed by the focusing means 37 into the acoustic coupling medium 41, which then transmits the acoustic radiation into the reservoir 13.

In operation, each reservoir 13 and 15 of the device is filled with a combination of two or more immiscible fluids, as explained above. The acoustic ejector 33 is positionable by means of ejector positioning means 43, shown below reservoir 13, in order to achieve acoustic coupling between the ejector and the reservoir through acoustic coupling medium 41. If droplet ejection onto a substrate is desired, a substrate 45 may be positioned above and in proximity to the first reservoir 13 such that one surface of the substrate, shown in FIG. 1 as underside surface 51, faces the reservoir and is substantially parallel to the surface 17 of the fluid 14 therein. Once the ejector, the reservoir, and the substrate are in proper alignment, the acoustic radiation generator 35 is activated to produce acoustic radiation that is directed by the focusing means 37 to a focal point near the fluid surface 17 of the first reservoir. As a result, droplet 47 is ejected from the fluid surface 17, optionally onto a particular site (typically although not necessarily, a pre-selected, or "predetermined" site) on the underside surface 49 of the substrate. The ejected droplet may be retained on the substrate surface by solidifying thereon after contact; in such an embodiment, it is necessary to maintain the substrate surface at a low temperature, i.e., at a temperature that results in droplet solidification after contact. Alternatively, or in addition, a molecular moiety within the droplet attaches to the substrate surface after contact, through adsorption, physical immobilization, or covalent binding.

Figure 1B:
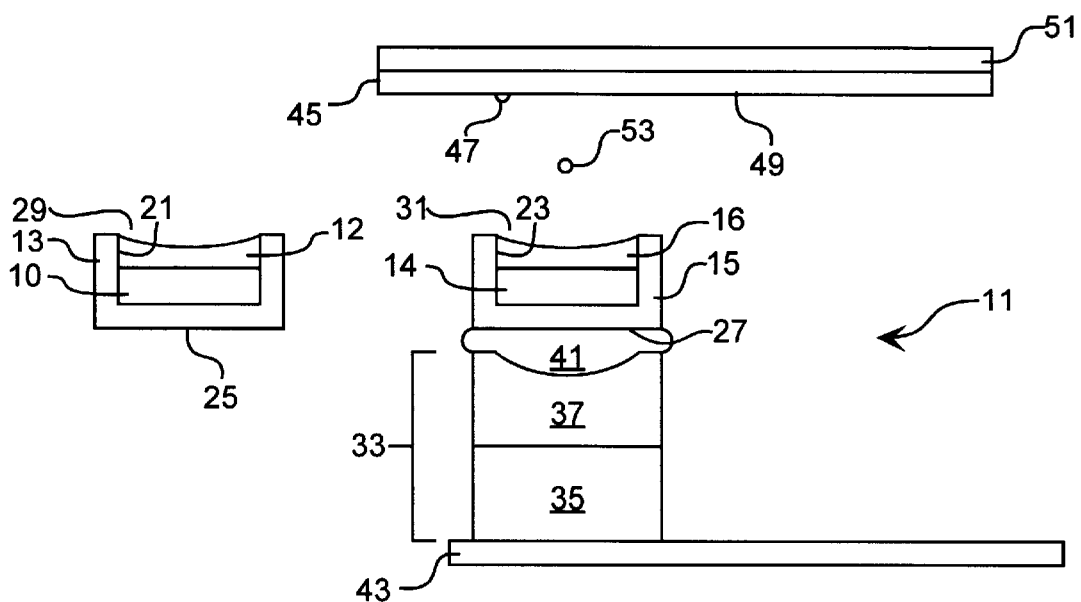

Then, as shown in FIG. 1B, a substrate positioning means 51 may be used to reposition the substrate 45 (if used) over reservoir 15 in order to receive a droplet therefrom at a second site. FIG. 1B also shows that the ejector 33 has been repositioned by the ejector positioning means 43 below reservoir 15 and in acoustically coupled relationship thereto by virtue of acoustic coupling medium 41. Once properly aligned, as shown in FIG. 1B, the acoustic radiation generator 35 of ejector 33 is activated to produce acoustic radiation that is then directed by focusing means 37 to a focal point within the reservoir fluids in reservoir 15, thereby ejecting droplet 53, optionally onto the substrate.

It should be evident that such operation is illustrative of how the inventive device may be used to eject a plurality of droplets from reservoirs in order to form a pattern, e.g., an array, on the substrate surface 49. It should be similarly evident that the device may be adapted to eject a plurality of droplets from one or more reservoirs onto the same site of the substrate surface. Furthermore, the ejection of a plurality of droplets may involve one or more ejectors. In some instances, the droplets are ejected successively from one or more reservoirs. In other instances, droplets are ejected simultaneously from different reservoirs.

The aforementioned method may be adapted to eject fluids of virtually any type and amount desired. For example, a first fluid may encapsulate a second fluid containing a biomolecule, e.g., a lipidic phase may encapsulate an aqueous fluid containing a pharmaceutical agent or other biologically active material. Furthermore, because of the precision that is possible using the inventive technology, the device may be used to eject droplets from a reservoir adapted to contain no more than about 100 nanoliters of fluid, preferably no more than 10 nanoliters of fluid. In certain cases, the ejector may be adapted to eject a droplet from a reservoir adapted to contain about 1 to about 100 nanoliters of fluid. This is particularly useful when the fluid to be ejected contains rare or expensive biomolecules, wherein it may be desirable to eject droplets having a volume of about 1 picoliter or less, e.g., having a volume in the range of about 0.25 picoliters to about 1 picoliter.

Any one reservoir or droplet may contain two or more immiscible fluids, although often only two immiscible fluids are present. The immiscible fluids may have different viscosities, and one or more of the fluids may have a fairly high viscosity, e.g., at least about 10 cps, possibly at least about 100 cps. In one embodiment, for example, one of the fluids in a single reservoir may have a viscosity in the range of approximately 10 cps to approximately 10,000 cps, and another of the fluids therein may have a viscosity of less than about 0.3 cps. In order to encapsulate a first fluid within a second, the lower layer should comprise the first fluid, and the upper layer should comprise the second, thus encapsulating fluid. This may result in the formation of features on a substrate surface wherein one of the fluids circumscribes another of the fluids, as discussed in detail below.

In a typical case, one of the immiscible fluids in a reservoir is aqueous, and another of the immiscible fluids is nonaqueous. Aqueous fluids include water per se as well as aqueous solutions, dispersions, and suspensions of various nonfluidic materials. Nonaqueous fluids may be, for example, organic solvents, lipidic materials, or the like. Examples of organic solvents include, without limitation: hydrocarbons, including aliphatic alkanes such as hexane, heptane, octane, etc., cyclic alkanes such as cyclohexane, and aromatic hydrocarbons such as benzene, cumene, pseudocumene, cymene, styrene, toluene, xylenes, tetrahydronaphthalene and mesitylene; halogenated compounds such as carbon tetrachloride and chlorinated, fluorinated and brominated hydrocarbons such as chloroform, bromoform, methyl chloroform, chlorobenzene, o-dichlorobenzene, chloroethane, 1,1-dichloroethane, tetrachloroethanes, epichlorohydrin, trichloroethylene and tetrachloroethylene; ethers such as diethyl ether, diisopropyl ether, diisobutyl ether, 1,4-dioxane, 1,3-dioxolane, dimethoxymethane, furan and tetrahydrofuran; aldehydes such as methyl formate, ethyl formate and furfural; ketones such as acetone, diisobutyl ketone, cyclohexanone, methyl ethyl ketone, N-methyl-2-pyrrolidone and isophorone; amides such as dimethyl formamide and dimethyl acetamide; alcohols such as ethanol, isopropanol, t-butyl alcohol, cyclohexanol, glycerol, ethylene glycol and propylene glycol; amines, including cyclic amines such as pyridine, piperidine, 2-methylpyridine, morpholine, etc., and mono-, di- and tri-substituted amines such as trimethylamine, dimethylamine, methylamine, triethylamine, diethylamine, ethylamine, n-butylamine, t-butylamine, triethanolamine, diethanolamine and ethanolamine, as well as amine-substituted hydrocarbons such as ethylene diamine and diethylene triamine; carboxylic acids such as acetic acid, trifluoroacetic acid and formic acid; esters such as ethyl acetate, isopentyl acetate, propylacetate, etc.; lactams such as caprolactam; nitriles such as acetonitrile, propane nitrile and adiponitrile; organic nitrates such as nitrobenzene, nitroethane and nitromethane; and sulfides such as carbon disulfide.

Examples of lipidic materials include, but are not limited to, the following: phospholipids such as phosphorylated diacyl glycerides, particularly phospholipids selected from the group consisting of diacyl phosphatidylcholines, diacyl phosphatidylethanolamines, diacyl phosphatidylserines, diacyl phosphatidylinositols, diacyl phosphatidylglycerols, diacyl phosphatidic acids, and mixtures thereof, wherein each acyl group contains about 10 to about 22 carbon atoms and is saturated or unsaturated; fatty acids such as isovaleric acid, valeric acid, caproic acid, enanthic acid, caprylic acid, pelargonic acid, capric acid, lauric acid, myristic acid, palmitic acid, stearic acid, arachidic acid, behenic acid, lignoceric acid, oleic acid, linoleic acid, linolenic acid, and arachidonic acid; lower fatty acid esters comprising esters of the foregoing fatty acids, wherein the carboxylic acid group of the fatty acid is replaced with an ester moiety —(CO)—OR wherein R is a $C_1$–$C_3$ alkyl moiety optionally substituted with one or two hydroxyl groups; fatty alcohols corresponding to the aforementioned fatty acids, wherein the carboxylic acid group of the fatty acid is replaced by a —$CH_2OH$ group; glycolipids such as cerebroside and gangliosides; oils, including animal oils such as cod liver oil and menhaden oil, and vegetable oils such as babassu oil, castor oil, corn oil, cottonseed oil, linseed oil, mustard oil, olive oil, palm oil, palm kernel oil, peanut oil, poppyseed oil, rapeseed oil, safflower oil, sesame oil, soybean oil, sunflower seed oil, tung oil, or wheat germ oil; and waxes, i.e., higher fatty acid esters, including animal waxes such as beeswax and shellac, mineral waxes such as montan, petroleum waxes such as microcrystalline wax and paraffin, and vegetable waxes such as carnauba wax.

In pharmaceutical and biotechnological applications, one of the two phases may contain a biomolecule, e.g., a molecular moiety selected from the group consisting of DNA, RNA, antisense oligonucleotides, peptides, proteins (including fluorescent proteins), ribosomes, and enzyme cofactors such as biotin. Examples of such applications include chemical, biochemical, or cellular assays techniques known in the art. Thus, either one or both of the phases may include a dye. Fluorescent dyes and/or chemiluminescent materials are often employed in such applications and are well known in the art. The biomolecule may also be a pharmaceutical agent, for example, selected from the following groups: analgesic agents; anesthetic agents; antiarthritic agents; respiratory drugs, including antiasthmatic agents; anticancer agents, including antineoplastic drugs; anticholinergics; anticonvulsants; antidepressants; antidiabetic agents; antidiarrheals; antihelminthics; antihistamines; antihyperlipidemic agents; antihypertensive agents; anti-infective agents such as antibiotics and antiviral agents; antiinflammatory agents; antimigraine preparations; antinauseants; antineoplastic agents; antiparkinsonism drugs; antipruritics; antipsychotics; antipyretics; antispasmodics; antitubercular agents; antiulcer agents; antiviral agents; anxiolytics; appetite suppressants; central nervous system stimulants, including attention deficit disorder (ADD) and attention deficit hyperactivity disorder (ADHD) drugs; cardiovascular preparations including calcium channel blockers; beta-blockers and antiarrhythmic agents; cough and cold preparations, including decongestants; diuretics; genetic materials; herbal remedies; hormonolytics; hypnotics; hypoglycemic agents; immunosuppressive agents; leukotriene inhibitors; mitotic inhibitors; muscle relaxants; narcotic antagonists; nicotine; nutritional agents, such as vitamins, essential amino acids, and fatty acids; ophthalmic drugs such as antiglaucoma agents; parasympatholytics; peptide drugs; psychostimulants; sedatives; steroids; sympathomimetics; tranquilizers; and vasodilators, including coronary, peripheral, and cerebral vasodilators.

The invention is not limited, however, with respect to a combination of an aqueous fluid and a nonaqueous fluid. It must be emphasized that the method and device of the invention can be used with an unlimited number of immiscible fluids, including fluids that have a very high melting temperature, e.g., metals, alloys, and glasses. The ability to producing fine droplets of such materials is in sharp contrast to piezoelectric technology, insofar as piezoelectric systems perform suboptimally at elevated temperatures. The present method enables the acoustic radiation generator to be removed from the high temperature fluid (e.g., a liquid metal) and for the acoustic coupling medium to provide a thermal buffer or cooling. A cooling jacket may also be used, as described, for example, in U.S. Pat. Nos. 5,520,715 and 5,722,479 to Oeftering.

Accordingly, one of the immiscible fluids may be a liquid metal, including, but not limited to, a metal selected from the group consisting of mercury, aluminum, solder, gold, silver, plutonium, americium, mixtures thereof, and superconducting alloys. A second immiscible fluid ejected with a liquid metal might be, for example, a wax, a ceramic material, a precursor to a ceramic material, an amorphous material, or a precursor to an amorphous material. Coating a metal droplet (e.g., mercury) with a material such as a wax (e.g., beeswax or paraffin) would advantageously keep the metal isolated from oxygen when in flight to prevent oxidation. Another application involves coating glass beads with a thin metal layer, e.g., to form a retro-reflector. This would involve ejecting a droplet that contains a combination of a liquid metal and liquid glass. Still another application involves using the present droplet ejection technology to encase toxic compounds in glass or other materials to make such compounds safer for processing. A variation of this application involves encasing a radioactive compound in a material that is transparent to the emitted radiation. For example, an alpha emitter such as plutonium or americium may be encased in a material layer that is transparent to alpha particles, i.e., a very thin, porous layer that may comprise, for example, porous glass or a porous polymeric material.

The inventive method may be used to eject droplets that contain a material capable of altering the wetting properties of the substrate. For example, when an ejected droplet contains both aqueous and nonaqueous fluids, either or both of the fluids may contain a surface-modifying material capable of altering the wetting properties of the substrate surface. Once the droplet has been deposited on the substrate surface, either or both of the fluids may be evaporated from the deposited feature to allow the surface-modifying material to alter the wetting properties of the substrate surface at the location of the feature.

For applications in which a plurality of reservoirs is provided, each of the fluid-containing reservoirs may contain at least one fluid in common, even when the contents of the reservoirs differ. For example, when it is desired to eject droplets from reservoirs containing and upper and lower fluid layers, it is often preferred that the upper layer of each reservoir is comprised of the same fluid and that the lower layer of each reservoir contain different fluids. By appropriate application of focused acoustic energy to each of these reservoirs, a plurality of droplets may be ejected, wherein each droplet comprises different fluids encapsulated by a common fluid. Similarly, a plurality of droplets each comprising a common fluid core and a different exterior fluid may be produced from applying focused acoustic energy to a plurality of reservoirs of different fluid content, wherein the lower layer of each reservoir is comprised of the same fluid.

By adjusting various parameters associated with focused acoustic ejection, the characteristics of the resultant droplets may be altered. In order to control the proportion of the immiscible fluids contained each droplet, it is preferred that the proportion of immiscible fluids contained in each reservoir also be controlled. For example, when it is desired to encapsulate a relatively large amount of a first fluid within a second, the lower layer of a reservoir containing two layers of fluid should comprise the first fluid, the upper layer should comprise the second (encapsulating) fluid, and the thickness of the lower layer should be greater than the thickness of the upper layer. The thickness of the upper layer is preferably less than about 10% of the thickness of the lower layer, more preferably less than about 5% of the thickness of the lower layer, and typically in the range of about 0.1% to 5% of the thickness of the lower layer. However, the upper layer may, in some cases, comprise a molecular bilayer or even a molecular monolayer, e.g., when a very thin encapsulating "coating" is desired. Other factors which may have an effect on droplet production and the proportion of the immiscible fluids within each droplet include, for example, the location of the focal point of the acoustic focusing means, the intensity of the applied acoustic energy, the interfacial surface energy between the fluids, and the like.

Figure 2A:
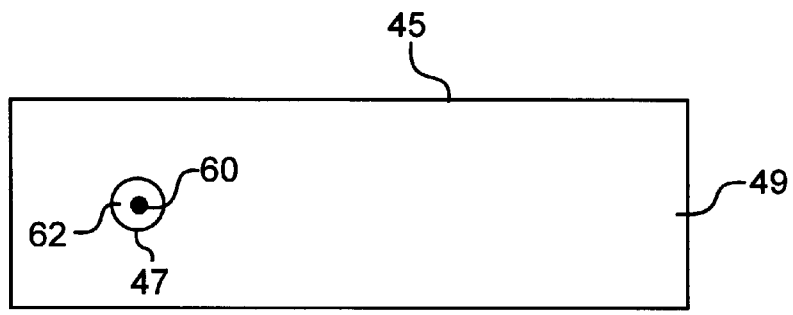
FIGS. 2A–2C, collectively referred to as FIG. 2, schematically illustrate the formation of a plurality of features of concentric immiscible fluids using the device of FIG. 1.
Figure 2B:
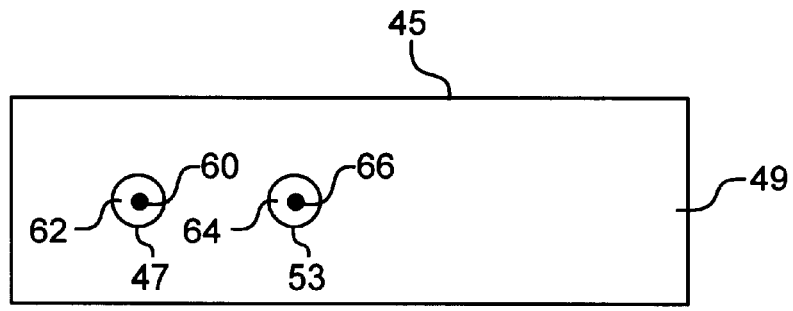

As discussed above, it may be desirable to generate droplets of immiscible fluids wherein, for example, one fluid encapsulates another, which in turn may result in the formation of features on a substrate surface such that one of the fluids circumscribes another of the fluids. While features of any size may be formed, the circumscribed fluid typically has a diameter of about 2 to about 200 micrometers. Preferably, the circumscribed fluid has a diameter of about 5 to about 50 micrometers. FIG. 2 schematically illustrates the formation of a plurality of features using the device illustrated in FIG. 1, wherein the features that are formed each comprise one fluid circumscribing another. FIG. 2A illustrates the substrate surface 49 after the first droplet 47 from the first reservoir 13 has been deposited thereon. As shown, the droplet 47 forms a circular feature that contains an inner fluid 60 circumscribed by an outer fluid 62. The inner fluid 60 originates from the lower fluid layer 10, and the outer fluid 62 originates from the upper fluid layer 12. FIG. 2B illustrates the substrate surface 49 after the deposition of the second droplet 53 from the second reservoir 15, thereby forming an additional circular feature that contains an inner fluid 64, originating from layer 14 and circumscribed by an outer fluid 66, originating from layer 16. Depending on the density, viscosity, and other properties of the fluids, one fluid may prevent direct contact between the other fluid and the substrate surface. That is, in some instances, one fluid may lie above the other. Furthermore, these properties may dictate which fluid circumscribes the other. In some instances, then, chimeric features may be formed, wherein the circumscribed or sequestered fluid may be mobile within the feature.

Figure 2C:
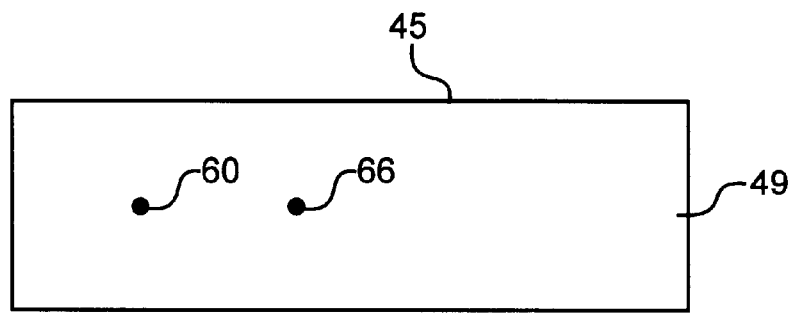

Furthermore, it should be evident that removal of one component of the droplets may result in the formation of a feature of reduced size. For example, the circumscribing fluids of droplets 47 and 53 in some instances may have a much lower boiling point than the fluids circumscribed thereby. When the circumscribing fluids are preferentially evaporated from the substrate surface, as depicted in FIG. 2C, the resulting features comprised of the inner fluids 60 and 64 exhibit a smaller size than before the removal of fluids 62 and 66.

Thus, the invention provides a method for reducing the size of a feature formed by a device for forming a feature of a nominal size on a substrate. A device as described above is provided for ejecting droplets of a predetermined volume from the reservoir, wherein the predetermined volume corresponds to a nominal size of a feature that contains an equivalent volume of fluid. Instead of filling the reservoir with a single fluid, the reservoir is filled with a feature-forming fluid and an additional fluid that is immiscible with the feature-forming fluid. Once a substrate is provided in droplet-receiving relationship to the reservoir, the device is activated to generate focused acoustic energy in a manner effective to eject a droplet comprised of the immiscible fluids from the reservoir and of the predetermined volume. As a result, the ejected droplet is deposited on the substrate, and a feature of the feature-forming fluid is formed on the substrate. The additional fluid may also be deposited on the substrate. It should, therefore, be apparent that the formed feature is smaller than the nominal feature size.

From the above results, it is evident that various components of the device may require individual control or synchronization to form an array on a substrate. For example, the ejector positioning means may be adapted to eject droplets from each reservoir in a predetermined sequence associated with an array to be prepared on a substrate surface. Similarly, the substrate positioning means for positioning the substrate surface with respect to the ejector may be adapted to receive droplets in a pattern or an array thereon. Either or both positioning means (i.e., the ejector positioning means and the substrate positioning means) may be constructed from motors, levers, pulleys, gears, a combination thereof, or other electromechanical or mechanical means known to one of ordinary skill in the art. It is preferable to ensure that there is a correspondence between the movement of the substrate, the movement of the ejector, and the activation of the ejector to allow proper pattern formation.

The device may also include certain performance-enhancing features, such as a cooling means to lower the temperature of the substrate surface in order to ensure, for example, that the ejected droplets adhere to the substrate. The cooling means may be adapted to maintain the substrate surface at a temperature that allows fluid to partially, or preferably substantially, solidify after the fluid comes into contact therewith. The device may also include a means for maintaining fluid in the reservoirs at a constant temperature, since repeated application of acoustic energy to a fluid will result in heating it, which can subsequently cause unwanted changes in fluid properties such as viscosity, surface tension, and density. Design and construction of such temperature-maintaining means are known to artisans of ordinary skill and will involve incorporation of at least one heating element and/or one cooling element. For many biomolecular applications, it is generally desired that the fluid containing the biomolecule be kept at a constant temperature without a deviation of more than about 1° C. or 2° C. therefrom. In addition, for a biomolecular fluid that is particularly heat sensitive, it is preferred that the fluid be kept at a temperature that does not exceed about 10° C. above the melting point of the fluid, preferably at a temperature that does not exceed about 5° C. above the melting point of the fluid. Thus, for example, when the biomolecule-containing fluid is aqueous, it may be optimal to keep the fluid at about 4° C. during ejection.

In some cases, a substrate surface may be modified prior to acoustic deposition of fluids thereon. Surface modification may involve functionalization or defunctionalization, smoothening or roughening, coating, degradation, or otherwise altering the surface's chemical composition or physical properties. A preferred surface modification method involves altering the wetting properties of the surface, for example, to facilitate confinement of a droplet ejected on the surface within a designated area, or to enhance the kinetics for the surface attachment of molecular moieties contained in the ejected droplet. A preferred method for altering the wetting properties of the substrate surface involves deposition of droplets of a suitable surface modification fluid at each site of the substrate surface to which an array element will attach, prior to acoustic ejection of fluids to form an array thereon. In this way, the "spread" of the acoustically ejected droplets may be optimized, and consistency in spot size (i.e., diameter, height, and overall shape) may be ensured. One way to implement the method involves acoustically coupling the ejector to a modifier reservoir containing a surface modification fluid and then activating the ejector, as described in detail above, to produce and eject a droplet of surface modification fluid toward a particular site on the substrate surface. The method is repeated as desired to deposit surface modification fluid at additional surface sites.

When the present process and device are used to prepare an array on a substrate surface, the properties of the array constituents are generally screened in a manner appropriate to the particular array. Screening for material properties may be accomplished by measuring physical and chemical properties, including by way of example rather than limitation, evaluating the chemical, mechanical, optical, thermal, electrical, or electronic characteristics by routine methods easily adaptable to microarrays. In addition to bulk material characteristics or properties, surface-specific properties may be measured by surface-specific physical techniques as well as physical methods that are adapted to surface characterization. Macroscopic surface phenomena, including adsorption, catalysis, surface reactions (such as oxidation), hardness, lubrication, and friction, may be examined on a molecular scale using such characterization techniques. Various physical surface characterization techniques include without limitation: diffractive techniques, spectroscopic techniques, microscopic surface imaging techniques, surface ionization mass spectroscopic techniques, thermal desorption techniques, and ellipsometry. It should be appreciated that these classifications are arbitrary made for purposes of explication, and some overlap may exist.

Figure 3:
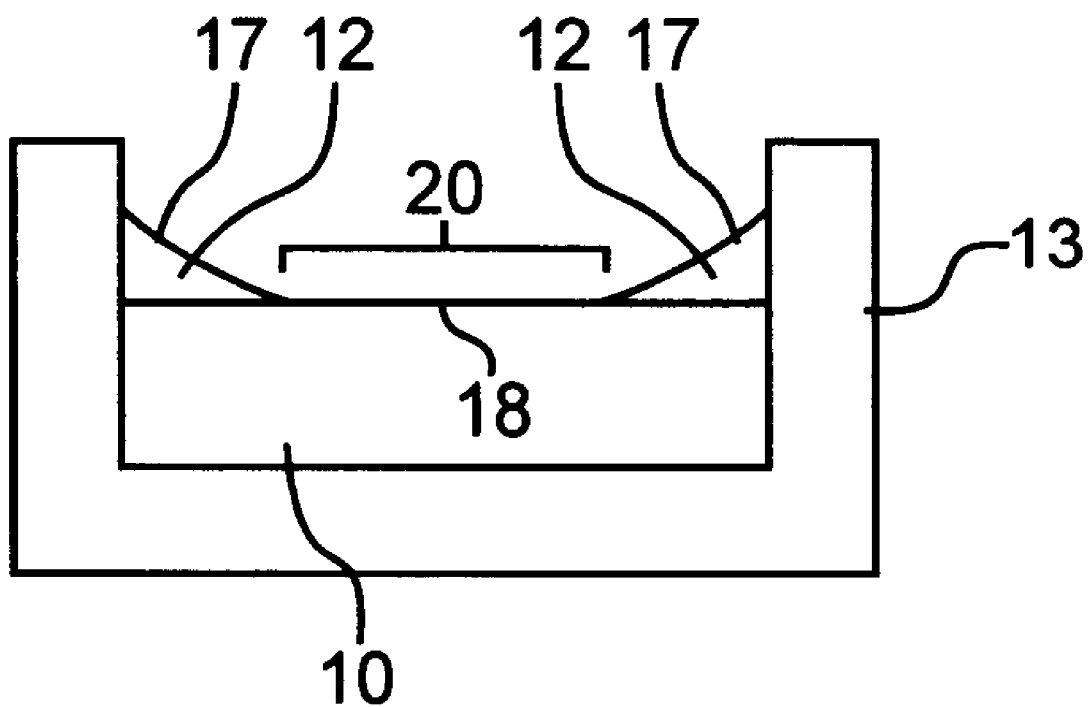
FIG. 3 schematically illustrates in simplified cross-sectional view a reservoir containing a lower fluid layer of uniform thickness and an upper fluid layer of nonuniform thickness, wherein the upper fluid layer contains an aperture region in the form of a hole that extends through the upper fluid layer.

The invention finds additional value in situations requiring the generation of fluid droplets from a reservoir containing immiscible fluids, wherein the droplets are useful per se with or without attachment to a substrate. For example, it has been observed that layers of immiscible fluids in a reservoir may not exhibit a uniform thickness. In some instances, an upper layer may contain an aperture region that exhibits a local thickness minimum. This is illustrated in FIG. 3. As depicted, a reservoir 13 may contain a lower fluid layer 10 and an upper fluid layer 12. Lower fluid layer 10 has a substantially uniform thickness bounded by surface 18. Upper fluid layer 12, however, does not exhibit a uniform thickness. Instead, upper fluid layer 12 has a curved upper surface indicated at 17. In addition, the upper fluid layer 12 contains a hole that represents an aperture region 20 extending through the center of the upper fluid layer 12. It has been observed that the aperture region tends to be of high dimensional stability.

This geometry is useful in a number of contexts. For example, reservoirs for use with the present invention may contain minute amounts of fluids. This tends to result in large fluid surface-to-volume ratios. As a result, fluids in the reservoirs may evaporate over time. Thus, in some instances, it is desirable to provide an upper layer of fluid that has a relatively high boiling point to prevent evaporation of fluid from the lower layer. That is, the upper layer serves as a vapor barrier to contain the vapors of the fluid in the lower layer. This poses a problem, however, when there is a need to eject fluid from the lower layer out of the reservoir in a manner such that the droplet formed contains a minimal amount of fluid from the upper layer. Thus, the upper layer of nonuniform thickness may serve as a vapor barrier for the lower fluid layer, while the accompanying aperture region provides a location through which droplets from the lower layer may be ejected without resulting in droplets coated with an excessive amount of fluid from the upper layer.

Accordingly, another embodiment of the invention provides a method for acoustically generating a droplet. The method involves first providing a reservoir containing immiscible fluids. The immiscible fluids are contained in the reservoir as a lower layer of a first fluid and an upper layer a second fluid. The first and second fluids are immiscible, and the upper layer has a nonuniform thickness. Then, focused acoustic energy is applied in a manner effective to eject a droplet from the reservoir, wherein the droplet is comprised of a predetermined volume of the first fluid propelled though the upper layer at an aperture region that exhibits a local thickness minimum.

Typically, the portion of the lower layer under the aperture region exhibits a greater thickness than the thickness of the aperture region. In most instances, the thickness of the aperture region is no more than about 10% of the thickness of the lower layer under the aperture region. In some instances, the aperture region of the upper layer is a molecular bilayer. In more limited instances, the aperture region is a molecular monolayer. As depicted in FIG. 3, the aperture region may at times take the form of a hole extending through the upper layer. The aperture region may have any diameter that is smaller than the diameter of the upper layer. However, it is preferred that the diameter of the aperture region be at least about twice that of the ejected droplet, but no more than about 10 times that of the ejected droplet.

For any of the above embodiments, focused acoustic energy may be used to eject droplets at a rate of at least about 1,000,000 droplets per minute from the same reservoir, and at a rate of at least about 100,000 droplets per minute from different reservoirs. In addition, current positioning technology allows for the ejector positioning means to move from one reservoir to another quickly and in a controlled manner, thereby allowing fast and controlled ejection of different fluids. That is, current commercially available technology allows the ejector to be moved from one reservoir to another with repeatable and controlled acoustic coupling at each reservoir in less than about 0.1 second for high performance positioning means, and in less than about 1 second for ordinary positioning means. A custom designed system will allow the ejector to be moved from one reservoir to another with repeatable and controlled acoustic coupling in less than about 0.001 second. In order to provide a custom designed system, it is important to keep in mind that there are two basic kinds of motion: pulse and continuous. Pulse motion involves the discrete steps of moving an ejector into position, emitting acoustic energy, and moving the ejector to the next position; again, using a high performance positioning means with such a method allows repeatable and controlled acoustic coupling at each reservoir in less than 0.1 second. A continuous motion design, on the other hand, moves the ejector and the reservoirs continuously, although not at the same speed, and provides for ejection during movement. Since the pulse width is very short, this process enables over 10 Hz reservoir transitions, and even over 1,000 Hz reservoir transitions.

In order to ensure the accuracy of fluid ejection, it is important to determine the location and the orientation of the fluid surface from which a droplet is to be ejected with respect to the ejector. Otherwise, ejected droplets may be improperly sized or travel in an improper trajectory. Thus, another embodiment of the invention relates to a method for determining the height of a fluid surface or fluid layers in a reservoir between ejection events. The method involves acoustically coupling a fluid-containing reservoir to an acoustic radiation generator and activating the generator to produce a detection acoustic wave that travels to the fluid surface and is reflected thereby as a reflected acoustic wave. Parameters of the reflected acoustic radiation are then analyzed in order to assess the spatial relationship between the acoustic radiation generator and the fluid surface. Such an analysis involves determination of the distance between the acoustic radiation generator and the fluid surface, and/or the orientation of the fluid surface in relationship to the acoustic radiation generator.

More particularly, the acoustic radiation generator may be activated so as to generate low energy acoustic radiation that is insufficiently energetic to eject a droplet from the fluid surface. The generation of such low energy acoustic radiation is typically accomplished by using an extremely short pulse (on the order of tens of nanoseconds), relative to that normally required for droplet ejection (on the order of microseconds). By determining the time it takes for the acoustic radiation to be reflected by the fluid surface back to the acoustic radiation generator, and then correlating that time with the speed of sound in the fluid, the distance B—and thus the fluid height—may be calculated. Of course, care must be taken to ensure that the acoustic radiation reflected by the interface between the reservoir base and the fluid is discounted. It will be appreciated by those of ordinary skill in the art of acoustic microscopy that such a method employs conventional or modified sonar techniques. It will be further appreciated that such sonar techniques may be employed to locate the aperture region of the upper layer of fluid in a reservoir when present.

Once the analysis has been performed, an ejection acoustic wave having a focal point near the fluid surface is generated in order to eject at least one droplet of the fluid, wherein the optimum intensity and directionality of the ejection acoustic wave may be determined using the aforementioned analysis, optionally in combination with additional data. The "optimum" intensity and directionality are generally selected to produce droplets of consistent size and velocity. For example, the desired intensity and directionality of the ejection acoustic wave may be determined by using not only the spatial relationship assessed as above, but also geometric data associated with the reservoir, fluid property data associated with the fluid to be ejected, and/or historical droplet ejection data associated with the ejection sequence. In addition, the data may show the need to reposition the ejector, so as to reposition the acoustic radiation generator with respect to the fluid surface, in order to ensure that the focal point of the ejection acoustic wave is near the fluid surface where desired. For example, if analysis reveals that the acoustic radiation generator is positioned such that the ejection acoustic wave cannot be focused near the fluid surface, the acoustic radiation generator is repositioned using vertical, horizontal, and/or rotational movement to allow appropriate focusing of the ejection acoustic wave.

As discussed above, either individual (e.g., removable) reservoirs or well plates may be used to contain combinations of immiscible fluids that are to be ejected, wherein the reservoirs or the wells of the well plate are preferably substantially acoustically indistinguishable from one another. Also, unless it is intended that the ejector be submerged in the fluids to be ejected, the reservoirs or well plates must have acoustic transmission properties sufficient to allow acoustic radiation from the ejector to be conveyed to the surfaces of the fluids to be ejected. Typically, this involves providing reservoirs or well bases that are sufficiently thin to allow acoustic radiation to travel therethrough without unacceptable dissipation. In addition, the material used in the construction of reservoirs must be compatible with the fluids contained therein. Thus, if it is intended that the reservoirs or wells contain a particular organic solvent, polymers that dissolve or swell in that solvent would be unsuitable for use in forming the reservoirs or well plates. For water-based fluids, a number of materials are suitable for the construction of reservoirs and include, but are not limited to, ceramics such as silicon oxide and aluminum oxide, metals such as stainless steel and platinum, and polymers such as polyester and polytetrafluoroethylene. Many well plates are commercially available and may contain, for example, 96, 384, 1536, or 3456 wells per well plate. Manufacturers of suitable well plates for use in the inventive device include Corning, Inc. (Corning, N.Y.) and Greiner America, Inc. (Lake Mary, Fla.). However, the availability of such commercially available well plates does not preclude the manufacture and use of custom-made well plates that contain at least about 10,000 wells, or as many as 100,000 wells or more. For array-forming applications, it is expected that about 100,000 to about 4,000,000 reservoirs may be employed. In addition, to reduce the amount of movement needed to align the ejector with each reservoir or well, it is preferable that the center of each reservoir be located not more than about 1 centimeter, preferably not more than about 1 millimeter, and optimally not more than about 0.5 millimeter from a neighboring reservoir center.

It is to be understood that, while the invention has been described in conjunction with the preferred specific embodiments thereof, the foregoing description is intended to illustrate and not limit the scope of the invention. Other aspects, advantages, and modifications will be apparent to those skilled in the art to which the invention pertains.

All patents, patent applications, journal articles, and other references cited herein are incorporated by reference in their entireties.

The following examples are put forth so as to provide those of ordinary skill in the art with a complete disclosure and description of how to implement the invention, and is not intended to limit the scope of what the inventors regard as their invention.

EXAMPLE 1

Aqueous fluid containing a dye was ejected through an immiscible layer of mineral oil, and ejection was performed using an F=3 lens with a 6 mm aperture and a nominal 18 mm focal length in water. Water was used as a coupling fluid to conduct acoustic energy from the lens to the bottom of a Greiner 384 polystyrene well plate with a number of the wells containing 36 µL of aqueous solution.

Accordingly, an aqueous solution was prepared containing 5 µg/ml cyanine-5 dye (Pharmacia) and a 4× concentration of sodium citrate buffer (4×SCC), pH=7.0. Blue food coloring was also added to help visualize the ejected drops. After preparation of the aqueous solution, 1 µL, 2 µL, and 4 µL of white mineral oil (Rite-Aid) were pipetted onto the aqueous fluid contained in three individual wells in the well plate in order to provide a lipidic layer on the aqueous solution. The lipidic layers ranged from about 2.7% to about 11% of the total well depth.

RF energy delivered to the transducer was 30 MHz and delivered with a peak-to-peak amplitude of 150 V for 65 microseconds. The distance of the transducer to the well plate was adjusted to maintain the focal point of the acoustic energy within the aqueous layer, but near enough to the aqueous/oil interface to achieve ejection. Stable droplet ejection was observed in all three cases, i.e., the size, velocity, and direction of all ejected droplets were consistent. For purposes of comparison, droplets of water and droplets of mineral oil were ejected under the same conditions. The droplet sizes for the aqueous fluid covered with oil were similar to droplet sizes for the aqueous fluid not covered with oil. The average size of the deposited "water-only" spots was approximately 120 micrometers in diameter when ejected onto a porous surface, i.e., onto nitrocellulose-coated glass slides (FAST™ slides from Schleicher and Schuell, Inc., Keene, N.H.). Droplets formed from the water/oil reservoirs were of similar size and formed spots of similar size as well.

EXAMPLE 2

The experiment of Example 1 was repeated using dimethyl sulfoxide (DMSO) instead of the 4×SSC. Again, droplet ejection was stable, and droplet size was similar to the size of the DMSO droplets not containing oil. As the oil and the DMSO were slightly miscible, but remained in layers for many hours, oil and DMSO are considered kinetically immiscible. Scans of the "DMSO-only" spots had significantly larger diameters than the aqueous spots, since DMSO tends to dissolve the nitrocellulose upper layer on the FAST™ slides. DMSO/oil spot sizes formed on the same substrate were much more consistent, indicating that the oil served as a protective layer between the DMSO and the substrate.

EXAMPLE 3

The experiment of claim 1 was repeated using an ordinary glass slide in place of nitrocellulose-coated surface of FAST™ slides. In addition, fluorescent dye (Cholesteryl BODUPY 576/589 C11) was added to the mineral oil and the blue food coloring in the aqueous solution was replaced with cyanine 5, another fluorescent dye that exhibits fluorescence at 670 nm. As a result, features were formed on a smooth planar surface of the slide, wherein the oils formed hydrophobic spots of about 5 to 10 µm in diameter circumscribed by a region containing cyanine 5 having a diameter of greater than about 100 µm.

EXAMPLE 4

A fluid is prepared containing a perfluorinated polyether liquid of low molecular weight that evaporated at approximately the same temperature as water. A fluorescently labeled surface-modifying agent, capable of reacting with a glass surface to render the surface hydrophobic, is added to the fluid. The perfluorinated fluid is placed in a well. Then, water is introduced into the well. As water has a lower density than perfluorinated polyethers, water covers the perfluorinated fluid.

Droplets of the perfluorinated fluid are acoustically ejected through the upper layer of water and deposited on a glass slide. As a result, features comprising water circumscribed by the perfluorinated fluid are formed. Then, heat is applied to the slide so as to evaporate water and perfluorinated polyethers therefrom. As a result, the surface-modifying agent reacts with the surface of the slide to form ring-shaped hydrophobic features, wherein the center of the features remains an unmodified glass surface. The features are then visualized through the fluorescent labels.

We claim:

1. A method for acoustically generating a droplet, comprising:
    (a) providing a reservoir containing
        (i) a lower layer comprised of a first fluid, and
        (ii) an upper layer having a nonuniform thickness and comprised of a second fluid, wherein the first and second fluids are immiscible; and
    (b) applying focused acoustic energy to the reservoir in a manner effective to eject a droplet from the reservoir, wherein the droplet is comprised of a predetermined volume of the first fluid propelled though the upper layer at an aperture region that exhibits a local thickness minimum.

2. The method of claim 1, wherein the lower layer under the aperture region of the upper layer exhibits a greater thickness than the local thickness minimum of the upper layer.

3. The method of claim 1, wherein the local thickness minimum is no more than about 10% of the thickness of the lower layer under the aperture region.

4. The method of claim 3, wherein the aperture region of the upper layer is a molecular bilayer.

5. The method of claim 3, wherein the aperture region of the upper region is a molecular monolayer.

6. The method of claim 3, wherein the aperture region of the upper layer is a hole.

7. The method of claim 1, wherein the aperture region has a diameter of at least about twice that of the ejected droplet.

8. The method of claim 1, wherein the aperture region has a diameter of no more than about 10 times that of the ejected droplet.

9. The method of claim 1, wherein one of the fluids is aqueous and another of the fluids is nonaqueous.

10. The method of claim 1, wherein the ejected droplet contains a biomolecule.

11. The method of claim 10, wherein the biomolecule is selected from the group consisting of DNA, RNA, antisense oligonucleotides, peptides, proteins, ribosomes, and enzyme cofactors.

12. The method of claim 10, wherein the biomolecule is a pharmaceutical agent.

13. The method of claim 1, wherein the second fluid has a higher vaporization temperature than the first fluid.

14. The method of claim 13, wherein the second fluid is lipidic.

15. The method of claims 14, wherein the lipidic material is selected from the group consisting of fatty acids, fatty acid esters, fatty alcohols, glycolipids, oils, and waxes.

16. The method of claim 13, wherein the second fluid is selected from the group consisting of hydrocarbons, halocarbons, hydrohalocarbons, and silicones.

17. A method for forming an array of features on a substrate surface, comprising:
(a) providing a plurality of fluid-containing reservoirs, each containing
   (i) a lower layer comprised of a first fluid, and
   (ii) an upper layer having a nonuniform thickness and comprised of a second fluid, wherein
      the first and second fluids are immiscible,
      the fluid content contained in each reservoir is different from each other, and
      each upper layer has an aperture region that exhibits a local thickness minimum;
(b) applying focused acoustic energy to each of the reservoirs in a manner effective to eject a droplet from each reservoir, wherein each of the droplets is comprised of a predetermined volume of the first fluid propelled though the upper layer at the aperture region of its respective fluid-containing reservoir.

18. The method of claim 17, wherein the second fluid of each reservoir is the same.

19. The method of claim 18, wherein the second fluid has a higher vaporization temperature than the first fluid.

20. The method of claim 19, wherein the second fluid is lipidic.

21. The method of claim 20, wherein the lipidic material is selected from the group consisting of fatty acids, fatty acid esters, fatty alcohols, glycolipids, oils, and waxes.

22. The method of claim 19, wherein the second fluid is selected from the group consisting of hydrocarbons, halocarbons, hydrohalocarbons, and silicones.

23. The method of claim 17, wherein the first fluid of each reservoir is different.

24. The method of claim 17, wherein the droplets are ejected successively in step (b).

25. The method of claim 17, wherein the droplets are deposited simultaneously in step (b).

* * * * *